United States Patent
Aoyama et al.

(10) Patent No.: US 7,148,599 B2
(45) Date of Patent: Dec. 12, 2006

(54) IRON CORE WINDING, METHOD OF WINDING AN IRON CORE, AND VARIABLE RELUCTANCE ANGLE DETECTOR

(75) Inventors: Naohiko Aoyama, Tokyo (JP); Hiroyuki Kujirai, Tokyo (JP)

(73) Assignee: Minebea Co., Ltd., Nagano-ken (JP)

( * ) Notice: Subject to any disclaimer, the term of this patent is extended or adjusted under 35 U.S.C. 154(b) by 179 days.

(21) Appl. No.: 10/779,815

(22) Filed: Feb. 18, 2004

(65) Prior Publication Data
US 2005/0104704 A1    May 19, 2005

(30) Foreign Application Priority Data
Feb. 19, 2003  (JP) ............... 2003-041848

(51) Int. Cl.
G01D 5/245  (2006.01)
H02K 3/28  (2006.01)
H02K 15/095  (2006.01)
H02K 24/00  (2006.01)

(52) U.S. Cl. ............... 310/168; 310/254; 324/207.25
(58) Field of Classification Search ............... 310/166, 310/168, 169, 170, 171, 172, 254; 324/207.25; 318/661
See application file for complete search history.

(56) References Cited

U.S. PATENT DOCUMENTS

| | | | |
|---|---|---|---|
| 2,094,492 A * | 9/1937 | Pestarini ............... 322/27 |
| 3,041,486 A | 6/1962 | Moffitt | |
| 3,281,655 A * | 10/1966 | Blasingame ............... 323/348 |
| 3,641,467 A * | 2/1972 | Ringland et al. ............... 336/5 |
| 4,794,511 A * | 12/1988 | Lundin ............... 363/156 |
| 4,893,078 A * | 1/1990 | Auchterlonie ............... 324/207.17 |
| 5,486,731 A | 1/1996 | Masaki et al. | |
| 5,757,182 A | 5/1998 | Kitazawa | |
| 6,930,423 B1 * | 8/2005 | Kitazawa ............... 310/168 |

FOREIGN PATENT DOCUMENTS

| | | |
|---|---|---|
| EP | 0294929 A2 | 12/1988 |
| EP | 1450126 A2 * | 8/2004 |
| JP | A-06-229780 | 8/1994 |
| JP | A-08-178611 | 10/2001 |
| JP | A-2002-168652 | 6/2002 |
| JP | 2004251733 A * | 9/2004 |

OTHER PUBLICATIONS

European Search Report issued on Jul. 21, 2005 from the European Patent Office for the corresponding European patent application No. 04003790.5-2213.

* cited by examiner

Primary Examiner—Darren Schuberg
Assistant Examiner—David W. Scheuermann
(74) Attorney, Agent, or Firm—Adduci, Mastriani & Schaumberg, LLP

(57) ABSTRACT

An iron core winding is such that a winding of a given polarity is coiled in series so that the beginning of each coiling and the ending of each coiling cross on a magnetic pole that is positioned in the direction of a circumference of the iron core. When the winding of the magnetic core with the given polarity is completed, the winding direction is reversed and the remainder of the winding, which has the opposite polarity, is coiled in series so that the beginning of each coiling and the ending of each coiling cross in the reversed direction. A variable reluctance angle detector uses the iron core winding. The number of windings of the output winding is the same for each pole, and an induced voltage output of a sine wave is obtained.

8 Claims, 5 Drawing Sheets

| COILING ORDER | POLE NO. | COILS | DIRECTION |
|---|---|---|---|
| 1 | 1 | 29 | CW |
| 2 | 2 | 29 | CW |
| 3 | 3 | 29 | CCW |
| 4 | 4 | 29 | CCW |
| 5 | 5 | 29 | CW |
| 6 | 6 | 29 | CW |
| 7 | 7 | 29 | CCW |
| 8 | 8 | 29 | CCW |
| 9 | 9 | 29 | CW |
| 10 | 10 | 29 | CW |
| 11 | 11 | 29 | CCW |
| 12 | 12 | 29 | CCW |
| 13 | 13 | 29 | CW |
| 14 | 14 | 29 | CW |
| 15 | 15 | 29 | CCW |
| 16 | 16 | 29 | CCW |

FIG. 9

| COILING ORDER | POLE NO. | COILS | DIRECTION |
|---|---|---|---|
| 17 | 4 | 69 | CCW |
| 18 | 3 | 69 | CCW |
| 19 | 2 | 69 | CCW |
| 20 | 1 | 69 | CCW |
| 21 | 12 | 69 | CCW |
| 22 | 11 | 69 | CCW |
| 23 | 10 | 69 | CCW |
| 24 | 9 | 69 | CCW |
| 25 | 5 | 69 | CW |
| 26 | 6 | 69 | CW |
| 27 | 7 | 69 | CW |
| 28 | 8 | 69 | CW |
| 29 | 13 | 69 | CW |
| 30 | 14 | 69 | CW |
| 31 | 15 | 69 | CW |
| 32 | 16 | 69 | CW |

FIG. 10

| COILING ORDER | POLE NO | COILS | DIRECTION |
|---|---|---|---|
| 33 | 14 | 69 | CCW |
| 34 | 13 | 69 | CCW |
| 35 | 12 | 69 | CCW |
| 36 | 11 | 69 | CCW |
| 37 | 6 | 69 | CCW |
| 38 | 5 | 69 | CCW |
| 39 | 4 | 69 | CCW |
| 40 | 3 | 69 | CCW |
| 41 | 15 | 69 | CW |
| 42 | 16 | 69 | CW |
| 43 | 1 | 69 | CW |
| 44 | 2 | 69 | CW |
| 45 | 7 | 69 | CW |
| 46 | 8 | 69 | CW |
| 47 | 9 | 69 | CW |
| 48 | 10 | 69 | CW |

IRON CORE WINDING, METHOD OF WINDING AN IRON CORE, AND VARIABLE RELUCTANCE ANGLE DETECTOR

CROSS REFERENCE TO RELATED APPLICATION

This application is based on and incorporates by reference Japanese Patent Application No. 2003-041848, which was filed on 19 Feb. 2003.

BACKGROUND OF THE INVENTION

The present invention relates to an iron core winding, which is applicable to a stator iron core and a rotor iron core, and a variable reluctance angle detector that uses the iron core winding. Such an angle detector is widely used in devices that require alignment, such as a variety of robots and FA devices. In particular, the present invention relates to a variable reluctance angle detector that includes an iron core. A winding of the iron core is coiled with full turns, and an output winding that uses the iron core winding is coiled with the same winding number on each tooth. The shape of the rotor is formed to induce voltage in a sinusoidal manner.

In the past, detectors such as a resolver or a synchro have had a predetermined output signal form (primarily a sine wave or a cosine wave). For example, referring to FIG. 11, published Japanese patent application No. 06-229780 (which corresponds to U.S. Pat. No. 5,486,731) shows a detector in which winding groups x, which are coiled in series, are serially connected. The windings x are sequential and are formed at every slot 30. A group y of the winding groups x is constructed for each phase. In order to obtain a magnetic flux distribution according to a sine wave, a sine wave value is found for the winding number of each slot. The total winding number is divided by the value of the sine wave for each slot position.

As shown in FIG. 11, there are ten slots 30 of the ring-shaped core 29. That is, S=10. There are ten teeth 31. The winding group for one phase of the two-phase pole resolver is y. The winding group y for one phase is formed by ten of the winding groups x. The number of winding groups x is S. By forming n of the single-phase winding groups y, an n-phase winding group Z is formed. By forming the n-phase winding group Z for the entire circumference (2n radians) of the annular core 29, a pulse like magnetomotive force is generated as indicated by the bar graph of FIG. 11 for each winding group x. Note that the winding differs depending on the slot 30. When each magnetomotive force is connected with an approximation line, as shown in FIG. 11, the magnetic flux appears as a sine wave A.

The general formulas for the n-phase winding group Z, in which the winding groups x are serially connected are as follows:

$$N_{k1} = \frac{W\sin\left[2\pi P/S\left\{(k-1)+\frac{1}{2}\right\}\right]}{\sum_{i=1}^{S}\sin\left[2\pi P/S\left\{(i-1)+\frac{1}{2}\right\}\right]}$$

-continued $$N_{k(n)} = \frac{W\sin\left[2\pi P/S\left\{(k-1)+\frac{1}{2}\right\}+\frac{2\pi(n-1)}{n}\right]}{\sum_{i=1}^{S}\sin\left[2\pi P/S\left\{(i-1)+\frac{1}{2}\right\}+\frac{2\pi(n-1)}{n}\right]}$$

where $N_{k(n)}$ is the number of turns of the winding portion at the kth slot, k is an integer between 1 and S, in the nth winding group in the n-phase, i is a counter for the summation, W is the total number of turns (the sum of the windings wound at each slot of i=1 through S in one phase).

Referring to FIG. 12, published Japanese patent application 08-178611 (which corresponds to U.S. Pat. No. 5,757,182) shows another angle detector. In this example, in order to create a sinusoidal induced voltage distribution at the output winding for one phase, the output winding is distributed in a sine wave form.

In the variable reluctance angle detector of FIG. 12, the rotor has a form such that its gap permeance varies with angle θ in the manner of a sine wave. The structure includes an iron core. The number of poles of the excitation winding is the same as the number of slots. The output winding is coiled so that the distribution of the induced voltage generated at the output winding, for one phase, corresponds to a sine wave. The sine output winding 36 and the cosine output winding 37 are coiled with a one-slot pitch (no slot is skipped and the coils are connected in series). The electric angle between the sine output winding 36 and the cosine output winding 37 is ninety degrees. The windings are distributed such that the number (volume) of windings follows a sine wave distribution, so that each induced voltage distribution is sinusoidal. The number of windings for each of the output windings 36 and 37 is the number of turns that is proportional to sin θ for the sine winding and cos θ for the cosine winding, and the polarity of a given winding is determined according to the polarity of the sine output voltage 38 and cosine output voltage 39, by taking into account the polarity of the excitation winding 40.

In the stator windings shown in the two prior art documents discussed above, the winding groups are serially connected. Therefore, as shown in FIG. 5, the polarity of the magnetic poles is switched from magnetic pole 21 to magnetic pole 25. If the magnetic pole 21 is reversely wound, or wound counterclockwise (CCW) in a left-hand winding, the winding at the entrance, or beginning, and the winding at the exit, or end, cross. Thus, complete, fully-rounded coils are formed, and the required number of windings corresponds to the number of coils formed. The conventional winding method of FIG. 5 is shown for the purpose of comparison with the winding method of the present invention.

The crossover segment 212W, from winding 21W of the first magnetic pole 21, leads to a right-handed coil in the clockwise direction (CW) on the next magnetic pole 22 to form winding 22W. Winding 22W is further coiled so that it extends towards the next magnetic pole 23. Therefore, as shown, a gap with a dimension p is formed between the beginning and end of the winding 22W, and the final coil is not a complete, fully-rounded coil, as shown.

The crossover segment 223W that extends from the winding 22W is a left handed coil in the counterclockwise direction (CCW) on magnetic pole 23 to form winding 23W. Winding 23W is further coiled so that it extends toward the next magnetic pole 24. Therefore, like the first winding 21W, the third winding 23W is formed by complete, fully rounded coils, and the required number of windings corresponds to the number of coils formed.

The crossover segment 234W that extends from the winding 23W is a right handed coil in the clockwise direction (CW) on the next magnetic pole 24 to form winding 24W. Winding 24W is further coiled so that it extends towards the next magnetic pole 25. Therefore, a gap with a dimension p is formed, and the last coil is not fully-rounded and complete.

Next, the cross-over segment 245W that extends from the winding 24W is a left handed coil in the counterclockwise direction (CCW) on the magnetic pole 25 to form a winding 25W. The winding 25W is further coiled so that it extends toward the next magnetic pole. Therefore, as in the case of the first magnetic pole 21, winding 25W is formed by fully-rounded coils, and the required number of windings corresponds to the number of coils.

In the published Japanese patent application No. 06-229780, in order to obtain a sine wave magnetic flux distribution, a sine wave value is found for the winding number for each slot of the single-phase winding group, and the total winding number is divided by the value of the sine wave for each position of the slot. In published Japanese patent application 08-178611, in order to set the induced voltage distribution at the output winding for one phase to be a sine wave distribution, the output winding is coiled while being distributed at one slot pitch for each slot and distributed in a sine wave form. Therefore, in the prior art examples, the greater the number of turns in an output winding, the farther the output winding is from the corresponding magnetic pole. Thus, the correspondence between the magnetic flux distribution generated by the winding group for one phase and a sine wave is less accurate. Consequently, in practical use, the prior art devices often require adjustment. In addition, making the induced voltage distribution correspond to a sine wave distribution is also difficult and it often requires adjustment during practical use.

Furthermore, in the prior art examples, since the number of windings of the output winding is required to be distributed in correspondence to a sine wave, when the maximum number of windings of the winding group is coiled around a specific magnetic pole, the number of windings of other poles becomes less than the maximum number of windings. Therefore, the induced voltage of the output winding is reduced to a small value. Consequently, the induced voltage output for each winding group becomes small, and it is difficult to create intervals given the noise level.

When the maximum number of windings is further increased to maintain a large dynamic range by increasing the intervals with the noise level, the output winding is coiled further from the corresponding magnetic pole. Consequently, the magnetic flux distribution that is generated by the winding group for one phase does not accurately follow a sine wave distribution, and adjustment will be required. Further, a winding group that is enlarged due to a large number of windings requires a wide spacing from the adjacent winding group. Therefore, the total number of magnetic poles is limited, and the number of phases is limited as well. Further, when the interval between adjacent winding groups is narrow, the use of the winding device becomes difficult.

In addition, when a winding is such that there is a gap between the beginning and end of the winding, as shown in FIG. 5, there is a tendency for the magnetic property and the output voltage to be skewed. Furthermore, with regard to FIG. 5, when the polarity of a magnetic pole is set to be opposite to that of the previous winding, the gap p makes it difficult to design, manufacture and adjust the winding with the proper number of turns.

When windings are not serially connected and magnetic poles are skipped but when there is a gap between the beginning and end of a winding for a magnetic pole is as in FIG. 5, the same problem that is described above occurs.

SUMMARY OF THE INVENTION

The present invention was carried out by taking each of the above-mentioned problems into account with the objectives of providing an iron core winding that is coiled around magnetic poles in single turns, or wraps, along with a manufacturing method, and a variable reluctance angle detector that uses the iron core winding. The winding produces an induced voltage output of a sine wave without having a difference in the winding numbers of the output winding. That is, each pole has the same number of coils.

The iron core winding of the present invention is characterized by a winding of a single polarity coiled in series so that the beginning and the end of each coiling cross on a magnetic pole. Magnetic poles are positioned in the direction of the circumference of a stator. When the winding of a single polarity is completed, the winding direction is reversed and a winding of the opposite polarity is coiled in series so that the beginning of a coiling and the ending of a coiling cross one another on the corresponding pole.

The variable reluctance angle detector of the present invention is comprised of a stator in which an excitation winding and a two-phased output winding are coiled around magnetic poles. A rotor is included, and the rotor has a form such that the gap permeance of the stator changes in a sine wave form with respect to the angle of rotation ($\theta$). The output winding is comprised of the iron core winding mentioned above.

In addition, it is preferred that each pole of the output winding has the same winding number. Furthermore, it is characterized such that the winding number of the output winding poles is found by multiplying the winding number of the excitation winding by the ratio of the transformer.

In addition, it is preferable that the ratio of the transformer be approximately 0.28 or 0.5.

The manufacturing method of an iron core winding of the present invention is characterized in that a winding of the same polarity is coiled in series so that the beginning of the coiling and the ending of the coiling cross on a magnetic pole that is positioned in the direction of the circumference of the iron core. When the winding of the magnetic core with the same polarity is completed, the winding direction is reversed and the remainder of the winding, which has the opposite polarity, is coiled in series so that the beginning of each coiling and the ending of each coiling cross in the reversed direction. The word "cross" is that state shown in FIG. 6, such that the entrance side of the winding (beginning of the winding) and the exit side of the winding (end of the winding) overlap, in the cross-sectional view of the condition of the windings coiled around the poles that are arranged along a circumference of the iron core.

BRIEF DESCRIPTION OF THE DRAWINGS

The accompanying figures, in which like reference numerals refer to identical or functionally similar elements throughout the separate views and which, together with the detailed description below, are incorporated in and form part of the specification, serve to further illustrate various embodiments and to explain various principles and advantages in accordance with the present invention.

FIG. 9 is a table that shows coiling order, pole number, number of coils and direction of coils for an output cosine winding; and FIG. 10 is a table that shows coiling order, pole number, number of coils and direction of coils for an output sine winding.

DETAILED DESCRIPTION OF THE PREFERRED EMBODIMENTS

First Embodiment

Figure 1:
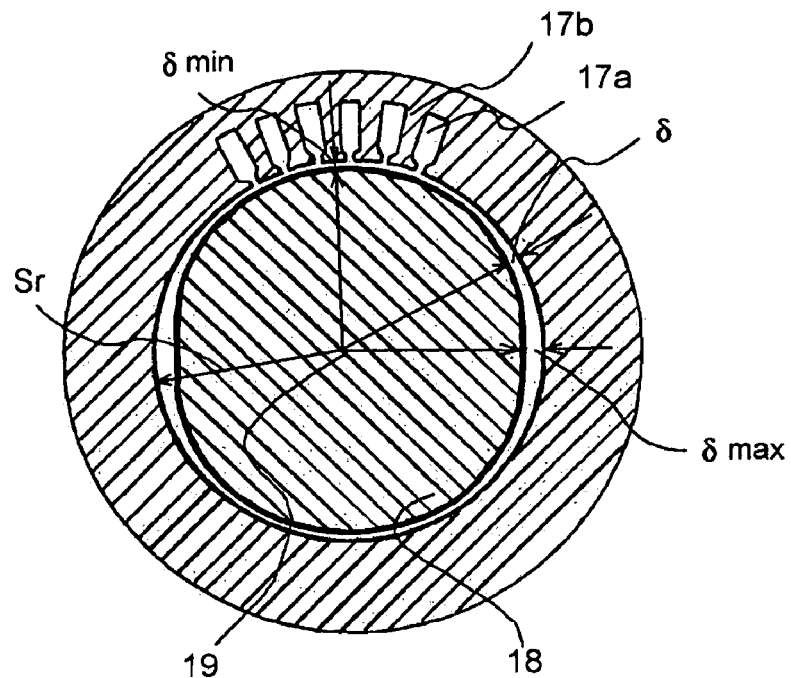
FIG. 1 is a diagrammatic cross sectional view of a rotor and stator of the present invention.
Figure 2:
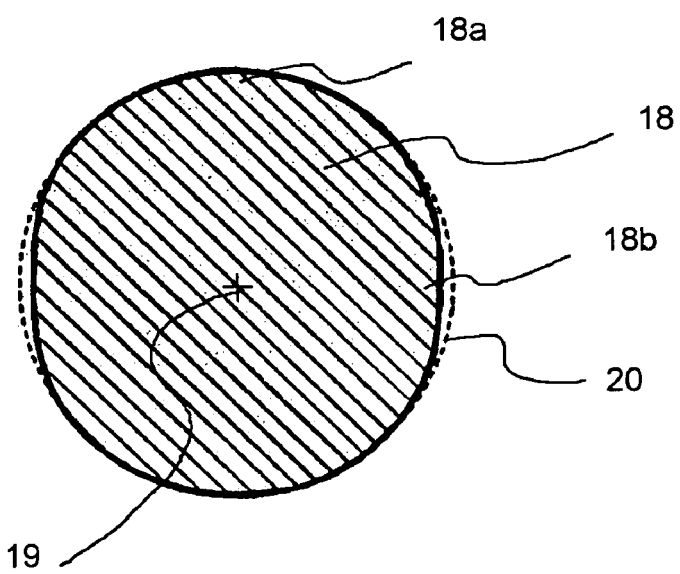
FIG. 2 is a diagrammatic cross sectional view of the rotor of FIG. 1.

With reference to FIG. 1 and FIG. 2, a stator 16 is comprised of a predetermined number of slots 17a at equal intervals. The slots 17a are formed on the inner surface of an annular yoke, and magnetic poles 17b are formed between the slots. The magnetic poles 17b and the slots 17a of the stator 17 are provided uniformly along the entire circumferential, inner surface of the stator 16; however, in FIG. 1, only a few of the slots 17a and poles 17b are shown for simplicity. A rotor 18 is merely an iron core and does not have a winding.

The excitation windings and output windings occupy the slots 17a of the stator 17. The number of poles of the excitation windings is the same as the total number of the magnetic poles 17b.

In the present invention, all of the output windings have the same the number of coils. That is, the number of coils is the same in each output winding. In other words, in the embodiment shown in FIG. 1, the number of coils of the output windings that are coiled around each of the magnetic poles 17b of the stator 17 is the same at each of the magnetic poles 17b. The number of coils of each output winding is found from the ratio of the transformer, which is the ratio of the maximum output voltage of the output winding and the excitation voltage of the excitation winding. The ratio of the transformer is defined in the Japan Electrical Manufacturer's Association Reference JEM-TR187. For practical purposes, it is desirable to set the ratio of the transformer to be 0.28, 0.5 or approximate values. Consequently, the induced voltage of the output winding can be set to a value that is not affected by noise during practical use.

Second Embodiment

Figure 5:
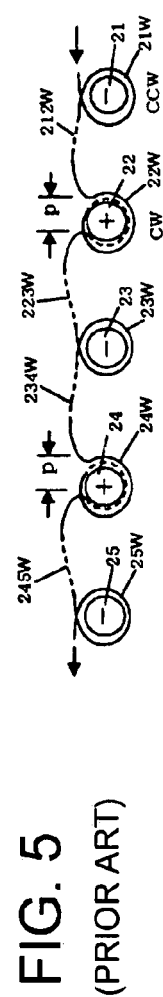
FIG. 5 is a diagrammatic view that illustrates a prior art winding method.
Figure 6:
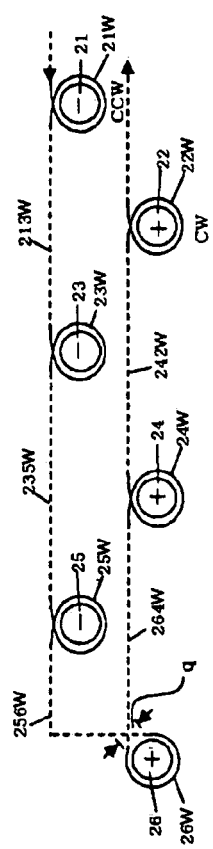
FIG. 6 is a diagrammatic view that illustrates a winding method of the present invention.
Figures 7, 8:
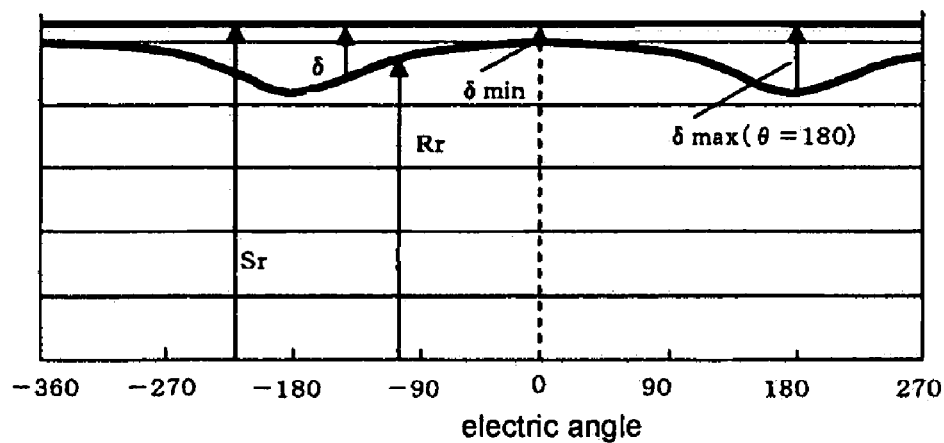
FIG. 7 is a graph that illustrates the shape of the rotor of FIG. 1.
FIG. 8 is a table that shows coiling order, pole number, number of coils and direction of coils for an excitation winding.
Figure 11:
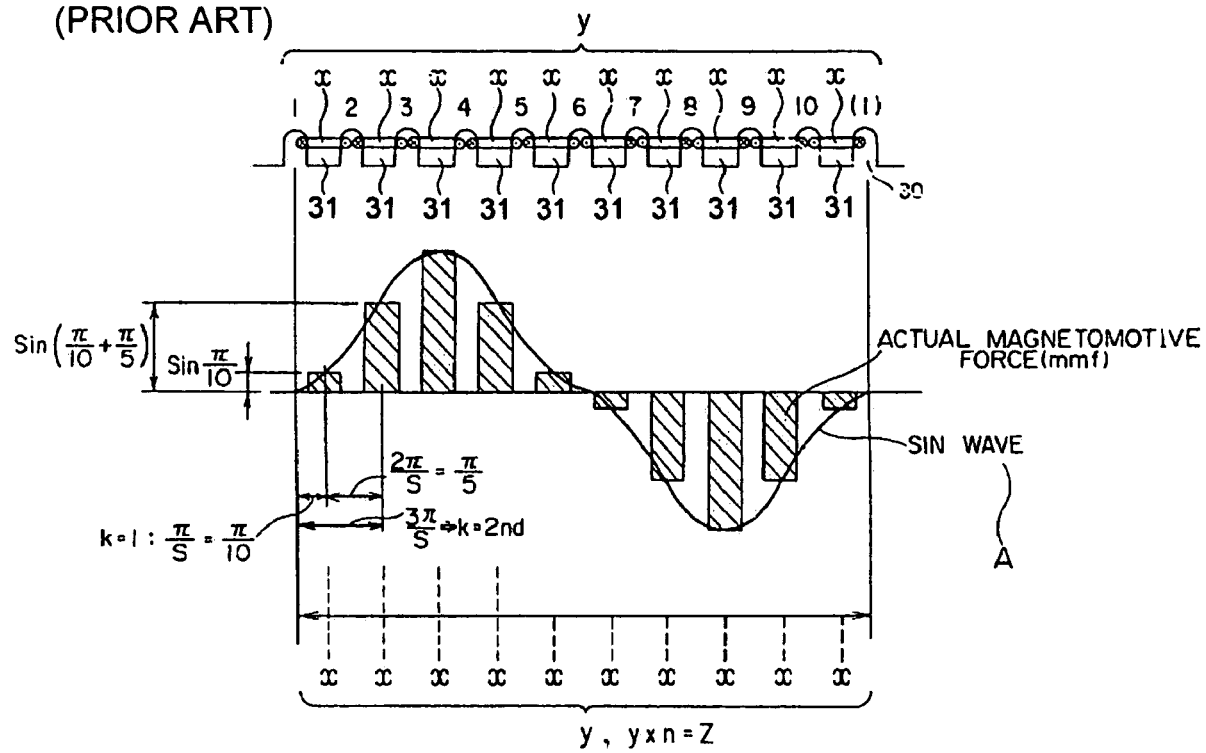
FIG. 11 is a detector in which winding groups x, which are coiled in series, are serially connected.
Figure 12:
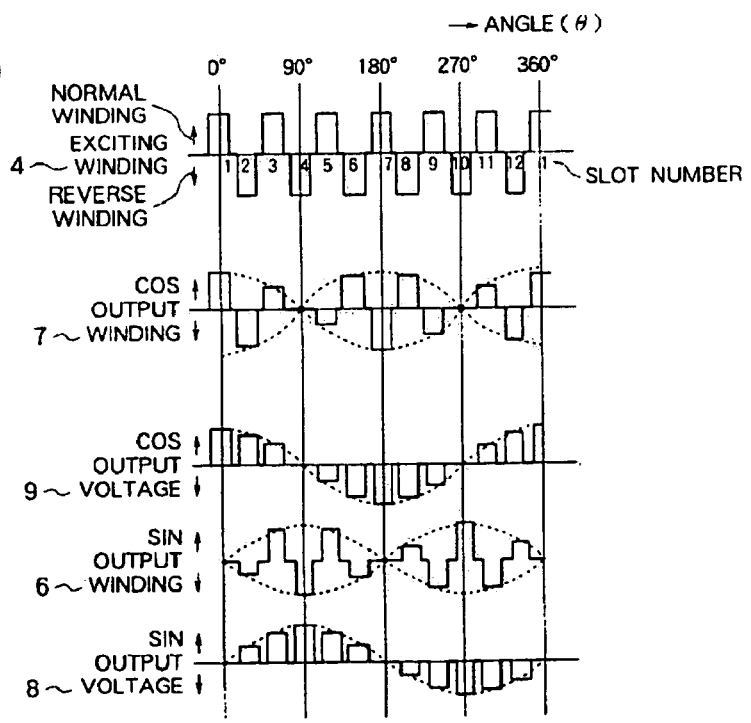
FIG. 12 is an angle detector wherein the output winding is distributed in a sine wave form in order to create a sinusoidal induced voltage distribution at the output winding for one phase.

In a winding method of FIG. 6, there are sixteen slots in the stator 17. FIGS. 8–10 show tables, which illustrate the relationship between the magnetic poles and the number of windings in the embodiment of FIG. 6. However, the polarity, or direction, of the windings is not as shown in the tables of FIGS. 8–10 but is the same as that in FIG. 5 (the prior art).

In the embodiment of FIG. 6, the winding is not serially connected at every slot. First, the N poles are entirely coiled, and then, the S poles are coiled by reversing the direction of the winding. Although FIG. 6 shows two rows of poles, the poles are actually arranged in the manner of FIG. 5. The poles are shown in two rows in FIG. 6 for illustrative purposes.

Figure 3:
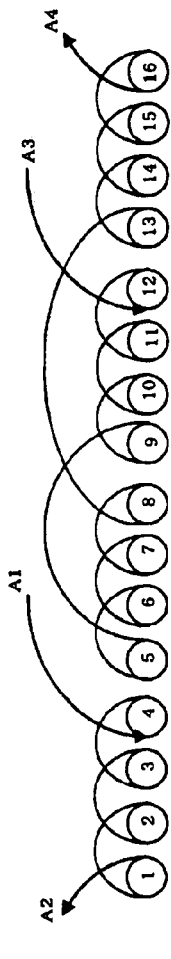
FIG. 3 is a diagrammatic view that illustrates the winding of a cosine winding of the present invention.
Figure 4:
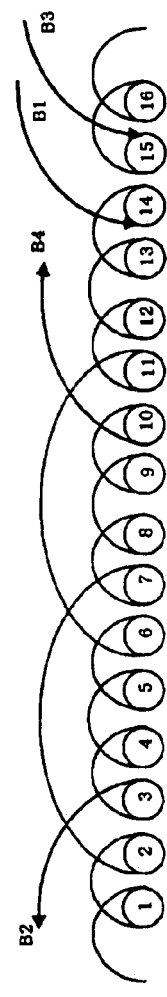
FIG. 4 is a diagrammatic view that illustrates the winding of a sine winding of the present invention.

FIG. 3 illustrates the winding method of the output winding of the table of FIG. 9 (cosine winding) and FIG. 4 describes the winding method of the output winding in the table of FIG. 10 (sine winding). FIG. 6 shows a winding method in which the stator winding is serially coiled by switching the polarity of the magnetic pole at every magnetic pole.

Third Embodiment

The winding method of the present invention is applicable to both a stator iron core and a rotor iron core. The following description applies to a stator iron core. First, windings with the same winding direction, or polarity, are coiled so that there is no gap p between the beginning of a winding and the ending of a winding. When that is complete, the winding direction is reversed. Magnetic poles with the opposite polarity are serially wound in the opposite direction such that there is no the gap p between the beginning of a winding and the end of a winding. In other words, windings with a first polarity are serially coiled in one direction so that the beginning of a winding and the ending of a winding cross, and then, when the coiling of windings with the first polarity is completed, the winding direction is reversed, and windings with the second, opposite polarity are serially coiled in the reversed direction, so that the beginning of the winding and the ending of the winding cross.

The winding method of this embodiment is described by referring to FIG. 6. However, the polarity of the magnetic poles is the same as that in the prior art example of FIG. 5. In FIG. 6, first, a magnetic pole 21 is reversely coiled (CCW). When winding 21W is coiled, the beginning and end of the winding completely cross, and fully-rounded coils are formed. Therefore the required number of windings corresponds to the number of coils, or turns. Next, the magnetic pole 23 is wound, and a crossover segment 213W, which extends from the first winding 21W, coils around the magnetic pole 23 in a left-handed (CCW), or reversed winding. Thus, winding 23W is the same as the first winding 21W. Therefore, the beginning and end of the winding 23W cross, and all coils are complete and fully rounded. Thus, the required number of windings corresponds to the number of the complete coils.

Next, the magnetic pole 25 is wound. A crossover segment 235W extends from winding 23W and is coiled in a reverse coil (CCW) or left-hand coil around the magnetic pole 25, in the same manner as the previous windings 21W, 23W.

A crossover segment 256W extending from winding 25W reverses the winding direction and is wound around the next magnetic pole 26 in the clockwise direction. The beginning and end of the winding 26W cross, and substantially complete fully-rounded coils are formed. As shown in FIG. 6 a gap q is formed between the beginning and the end of the winding 26W. However, the beginning and end of the winding 26W cross, and the gap q creates no problems in practical use.

The direction of the crossover segment 264W, which extends from the winding 26W, is opposite to the direction of the crossover segment 213W, and the crossover segment 264W is coiled around the next magnetic pole 24 in a right-handed, clockwise direction (CW) to form the winding 24W. Thus, the winding direction of the winding 24W is the same as that of the previous winding 26W.

Similarly, the crossover segment 242W extends from the winding 24W, and is coiled around the magnetic pole 22 clockwise (CW) to form the winding 22W. Similarly, in the winding 22W, the beginning and end of the winding cross and fully rounded coils are formed.

The present invention is based on the above-mentioned winding method. Embodiments 4 and 5 are further described by referring to the Tables 2 and 3.

Fourth Embodiment

FIG. 3 is a schematic diagram that explains the winding method of the cosine output winding of the table of FIG. 9. The cosine output winding is comprised of four winding groups for each pole of the winding group to obtain a cosine wave. FIG. 3 is for a case in which the stator 17 has 16 slots (16 magnetic poles), which are numbered in the clockwise direction. The winding groups for each pole are divided into a group of magnetic poles 1 to 4, a group of magnetic poles 5 to 8, a group of magnetic poles 9 to 12 and a group of magnetic poles 13 to 16.

The beginning of the winding A1 of the winding group enters from the left side of the magnetic pole 4, and left handedly coils about the magnetic pole 4 in a counterclockwise winding (CCW). A crossover segment extends from the magnetic pole 4 such that the entrance side winding and the exit side winding cross. In a manner similar to that of the magnetic pole 4, the winding of the next magnetic pole 3 is left handedly coiled about the magnetic pole 3 in a counterclockwise winding (CCW). A crossover segment extends from the magnetic pole 3 such that the entrance side winding and the exit side winding cross. Similarly, the remaining magnetic poles 2, 1 are left handedly coiled in a reversed winding (CCW). And a crossover segment A2 extends from the magnetic pole 1 as shown. The reason that this winding group is coiled in the order from magnetic pole 4 to magnetic pole 1 is that the left handedly coiled crossover segments extend to the left side in the drawing, and therefore, the coils are left-handed. The crossover segment A2 extends to the crossover segment A3. The crossover segment A3 enters from the left side of the magnetic pole 12, and as with the winding group for the magnetic poles 4 to 1, left-handed coils are formed in the order of pole 2, pole 11, pole 10 and pole 9 in a counterclockwise winding (CCW). Thus, the winding jumps to the next magnetic pole and continues left-handed coils in a counterclockwise winding (CCW). Therefore, the magnetic pole 9 receives a left-handed coil for the required number in a reversed winding (CCW), as shown.

There are no more magnetic poles of the same polarity to be left handedly coiled at this stage, thus, the magnetic poles of the opposite polarity are right handedly coiled in a clockwise winding (CW). In the case of the right handed coiling, the crossover segments extend to the right side of the coils. The crossover segment of the winding of magnetic pole 9 extends to the left side of the coil. However, the crossover segment of the next coil extends to the right side of the coil. The crossover segment extending from magnetic pole 9 extends to the right side of the magnetic pole 5, which is located on the far left of the winding group with the opposite polarity. The winding direction is reversed by right handedly coiling the magnetic pole 5 in a clockwise winding (CW). The crossover segment of the winding of the magnetic pole 5 reverses the winding direction and extends to the right side of the magnetic pole 6 of the same winding group and similarly coils right handedly in a clockwise winding (CW). The crossover segment of the winding of the magnetic pole 6 similarly extends to the magnetic pole 7 and coils right handedly in a clockwise winding (CW). When the winding of the magnetic pole 7 is completed, a crossover segment extends to the magnetic pole 8, and the magnetic pole 8 is similarly given a right-handed coil in a clockwise winding (CW). The crossover segment of the winding of the magnetic pole 8 extends to the right side of the magnetic pole 13, which is located on the far left of a winding group of the same polarity. The magnetic poles 13, 14, 15 and 16 of the winding group are coiled with right-handed coils, as in the case of the magnetic poles 5 to 8, in a clockwise winding (CW). The end of the winding A4 is drawn to a winding terminal.

In the case of the winding method of FIG. 3, other than the coil of the magnetic pole 5, where the winding direction is reversed, the beginnings and endings of the coils are crossed, and therefore each turn is a fully rounded, complete turn. Therefore, in principle, there is no need to consider gaps such as the gap q of FIG. 6, which indicates that an associated coil is less than a fully rounded turn. In addition, the coil of the magnetic pole 5 nearly forms one turn, and therefore, there is no practical problem in considering it to be one full turn unit.

Fifth Embodiment

FIG. 4 shows a winding method for the sine output winding of the table of FIG. 10. In principle, the winding method is the same as that of FIG. 3. The difference is that the position of the magnetic pole at the beginning of the winding and the magnetic pole at the end of the winding are different from those of FIG. 3.

The beginning of the winding B1 enters from the left side of the magnetic pole 14, and it left handedly coils in the order of magnetic pole 14, magnetic pole 13, magnetic pole 12, magnetic pole 11, magnetic pole 6, magnetic pole 5, magnetic pole 4 and magnetic pole 3, in a reversed winding (CCW). Next, in order to reverse the winding direction, a crossover segment B2 of the coil of the magnetic pole 3 extends to a crossover segment B3 and enters from the right side of the magnetic pole 15. This changes the direction of the winding by right handedly coiling the magnetic pole 15 in a clockwise winding (CW). The crossover segment from the magnetic pole 15 extends to the right side of the magnetic pole 16. Right-handed coils are formed in the order of magnetic pole 16, magnetic pole 1, magnetic pole 2, magnetic pole 7, magnetic pole 8, magnetic pole 9 and magnetic pole 10. Then, the end of the winding B4 is drawn to a winding terminal.

In the case of the winding method of FIG. 4, other than the coil of the magnetic pole 15 where the winding direction is reversed, the beginnings and endings of the coils are crossed. Therefore, each turn can be considered to be a full turn unit or winding number unit. Therefore, in principle, there are no gaps such as gap p of FIG. 5, which shortens the associated turn. In addition, the coil of the magnetic pole 15 practically a full turn. Therefore, there is no practical problem in considering it to be one full turn unit of the winding number.

The rotor 18 is shaped such that the gap permeance with the stator 17 follows a sine wave relative to the angle θ.

In the rotor 18 of FIG. 2, there are two magnetic poles 18a. The rotor includes two recesses 18b, which are shifted from the magnetic poles 18a by 90°. An imaginary circle 20 is defined by the maximum radius of the rotor 18. The symbol δ represents the gap between the stator 17 and the rotor 18. As shown in FIG. 1, δmin represents the minimum distance between the stator 17 and the rotor 18, which occurs at the poles 18a. The symbol δmax represents the maximum distance between the stator 17 and the rotor 18, which occurs at the recesses 18b, where the rotor 18 is the farthest from the imaginary circle 20.

The rotor shape is determined so that the reciprocal number of the air gap follows a sine wave. This is because the induced voltage of the coil of the stator is to follow a sine wave. The induced voltage is proportional to the changes in permeance; that is, the induced voltage is proportional to the reciprocal number of the gap.

Here, the gap is the distance δ between the stator 17 and the rotor 18, shown in FIG. 1. That is, the gap is the space between the distal end of one of the magnetic poles 17b of the stator 17 and one of the magnetic poles 18a of the rotor 18. The symbol Sr represents the inner radius of the stator 17 and is measured from the axis 19 to the inner circumference of the stator 17. The symbol Rr represents the radial dimension from the axis 19 to the outer circumferential surface of the rotor 18. The relationship between δ and θ is shown in the graph of FIG. 7. As shown in FIG. 7, δ=δmin at the electric angles of 0° and 360°, and δ=δmax at the electric angles of 180° and −180°.

In order to make the reciprocal number of the air gap correspond to a sine wave, the air gap δ is expressed as:

$$\delta = 1/(\alpha + \beta \cdot \cos\theta)$$

In addition, when the air gap is the difference of the stator radius and the rotor radius, it can be expressed as:

$$\delta = Sr - Rr$$

and then Rotor Radius Rr is $$Rr = Sr - \delta = Sr - 1/(\alpha + \beta \cdot \cos\theta)$$

Here, δ at θ=0 is expressed as δ min, and δ at δ=180 is expressed as δmax, and then it is:

$$\delta\min = 1/(\alpha + \beta)$$

$$\delta\max = 1/(\alpha - \beta)$$

Therefore, $$\alpha = ((1/\delta\min) + (1/\delta\max))/2$$

$$\beta = ((1/\delta\min) - (1/\delta\max))$$

By controlling the shape of the rotor with the rotor radius Rr, even if all the numbers of the windings of the magnetic poles of the stator are the same, a sine wave output and a cosine wave output from the output line can be output without practical difficulty.

With the iron core winding and manufacturing method of the present invention, except for a coil where the winding direction is reversed, the beginnings and endings of the coils are crossed. Therefore, each turn can be considered to be a full unit of the winding number, and in principle, there is no need to consider gaps p, which shorten the turns. In addition, the beginning and end of a coil where the winding direction is reversed practically form one turn, and there is no practical problem in considering it to be a full turn unit.

In addition, a variable reluctance angle detector using the iron core winding of the present invention can unify the number of windings of each output winding to be a relatively large winding number that is the same at each pole. Therefore, the induced voltage of the output winding can be set to a relatively large value that is not interfered with by noise. At the same time, the swelling of the windings is the same, so that the spaces between the adjacent windings are uniform. Consequently, the number of magnetic poles is not affected by the magnetic pole with the maximum winding number.

Furthermore, all the winding numbers of the output windings are the same, and therefore by increasing the precision of the shape of the rotor, in other words, by increasing the precision of the gap permeance between the rotor and stator that changes according to a sine wave relative to the angle θ, and without investigating other factors, the induced voltage can be shaped to a sine wave.

Moreover, by specifying the ratio of the transformer of the exciting winding and the output winding to be a preferred value, the induced voltage of the output winding can be set to be a value that is not interfered with by noise.

The invention claimed is:

1. An iron core winding for an iron core, wherein the winding includes coils of opposite polarities, and coils of a first polarity are coiled in series so that the beginning and ending of each coil cross on a corresponding magnetic pole, and coils of a second polarity, which is opposite to the first polarity, are coiled in series so that the beginning and ending of each coil cross on a corresponding magnetic pole, and the winding direction of the coils of the first polarity is opposite to that of the coils of the second polarity, wherein the iron core winding forms a two-phase output winding of a variable reluctance angle detector, and the variable reluctance angle detector includes:

a stator, in which an excitation winding and the two-phased output winding are coiled around the magnetic poles; and a rotor, which is shaped such that the gap permeance of the stator changes in a sine wave form according to an angle of rotation θ.

2. A variable reluctance angle detector in accordance with claim 1, wherein the winding number of the output winding is determined by multiplying the winding number of the excitation winding by the transformer ratio of the iron core winding.

3. A variable reluctance angle detector in accordance with claim 2 wherein, the transformer ratio is approximately 0.28.

4. A variable reluctance angle detector in accordance with claim 2 wherein, the transformer ratio is approximately 0.5.

5. A variable reluctance angle detector in accordance with claim 1, wherein the number of coils, or the winding number, is the same for each magnetic pole of the iron core winding.

6. A variable reluctance angle detector in accordance with claim 5, wherein the winding number of the output winding is determined by multiplying the winding number of the excitation winding by the transformer ratio of the iron core winding.

7. A variable reluctance angle detector in accordance with claim 6 wherein, the transformer ratio is approximately 0.28.

8. A variable reluctance angle detector in accordance with claim 6 wherein, the transformer ratio is approximately 0.5.

* * * * *